United States Patent
Uchiyama et al.

(10) Patent No.: US 6,319,845 B1
(45) Date of Patent: *Nov. 20, 2001

(54) METHOD OF PURIFYING ALKALINE SOLUTION AND METHOD OF ETCHING SEMICONDUCTOR WAFERS

(75) Inventors: Isao Uchiyama, Fukushima-ken; Hiroyuki Takamatsu, Shirakawa; Toshio Ajito, Fukushima-ken, all of (JP)

(73) Assignee: Shin-Etsu Handotai Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,151

(22) Filed: Mar. 2, 1998

(30) Foreign Application Priority Data

Mar. 13, 1997 (JP) .................................................. 9-059631
Feb. 23, 1998 (JP) ................................................ 10-039921

(51) Int. Cl.$^7$ ............................................................. H01L 21/3063
(52) U.S. Cl. ........................ 438/745; 438/750; 438/751; 438/753
(58) Field of Search ................................. 438/745, 750, 438/751, 753, 756; 427/304, 305; 156/345

(56) References Cited

U.S. PATENT DOCUMENTS

| | | | |
|---|---|---|---|
| 3,764,495 | 10/1973 | Guptill ..................................... | 204/99 |
| 4,376,714 | * 3/1983 | Pingaud .............................. | 252/62.56 |
| 4,859,280 | * 8/1989 | Lowry et al. .......................... | 156/662 |
| 5,078,894 | * 1/1992 | Horwitz et al. ......................... | 252/81 |
| 5,106,724 | * 4/1992 | Nogami et al. ........................ | 430/331 |
| 5,200,088 | 4/1993 | Pilznienski ............................ | 210/720 |
| 5,203,911 | * 4/1993 | Sricharoenchaiki et al. ........ | 106/1.26 |
| 5,203,955 | * 4/1993 | Viehbeck et al. ..................... | 156/628 |
| 5,252,522 | * 10/1993 | Dorbath et al. ........................ | 501/19 |
| 5,462,628 | * 10/1995 | Viehbeck et al. ..................... | 156/281 |
| 5,804,090 | * 9/1998 | Iwasaki et al. ........................ | 216/99 |

FOREIGN PATENT DOCUMENTS

| | | |
|---|---|---|
| 0 761 599 A2 | 8/1996 | (EP) . |
| 1156227 | 9/1966 | (GB) . |
| 05-15648 | 6/1993 | (JP) . |

* cited by examiner

*Primary Examiner*—Benjamin L. Utech
*Assistant Examiner*—Lan Vinh
(74) *Attorney, Agent, or Firm*—Arent Fox Kintner Plotkin & Kahn, PLLC

(57) ABSTRACT

A method of purifying an alkaline solution is capable of extremely efficiently nonionizing metallic impurity ions in an alkaline solution at a low cost. A method of etching semiconductor wafers in turn is capable of etching semiconductor wafers using the purified alkaline solution without deteriorating the quality of the semiconductor wafers. A reducing agent having an oxidation potential lower than a reversible electrode potential of metallic ions existing in the alkaline solution is dissolved in the alkaline solution to thereby nonionize the metallic ions existing in the alkaline solution.

8 Claims, 2 Drawing Sheets

METHOD OF PURIFYING ALKALINE SOLUTION AND METHOD OF ETCHING SEMICONDUCTOR WAFERS

BACKGROUND OF THE INVENTION

1. Field of the Invention

The present invention relates to a method of purifying an alkaline solution by effectively nonionizing or removing metallic impurity ions in the alkaline solution and a method of etching semiconductor wafers which can etch them without deteriorating the quality of the semiconductor wafers using a purified alkaline solution purified by the purifying method.

2. Description of the Related Art

Generally, a method of manufacturing semiconductor wafers includes a slicing step for obtaining wafers of thin disk shape by slicing a single crystal ingot; a chamfering step for chamfering a peripheral edge portion of the wafer obtained through the slicing step to prevent cracking and/or breakage of the wafer; a lapping step for flattening the surface of the chamfered wafer; an etching step for removing processing damages of the chamfered and lapped wafer; a polishing step for mirror-polishing the surface of the etched wafer; and a cleaning step for cleaning the polished wafer to remove a polishing agent and/or particles attached thereon.

The etching step may involve an acid etching process using an acid etching solution or an alkaline etching process using an alkaline etching solution such as sodium hydroxide or the like.

The acid etching is characterized by its high etching rate, so that it is difficult to uniformly etch over the entire surface of a wafer, thus causing a problem that the flatness of the wafer is reduced. For this reason, recently, an alkaline etching, which uses a sodium hydroxide solution, a potassium hydroxide solution, and an alkyl ammonium hydroxide solution, and so on, is predominantly employed because the alkaline etching does not deteriorate the flatness of the wafer.

In the alkaline etching of semiconductor wafers mentioned above, an industrial alkaline solution available on the market, having a rather high metallic impurity concentration, is used as it is. Even an alkaline solution of electronic industrial grade used for etching semiconductor wafers actually contains metallic impurities of several tens of ppb to several ppm.

Metallic impurities included in the alkaline solution may be nickel, chromium, iron, copper and so on.

It has been revealed the fact that when a semiconductor wafer is etched using an alkaline solution containing such metallic impurities, metallic ions of some of metallic impurities such as copper, nickel or the like dissolved in the alkaline etching solution diffuse deeply into the inside of the wafer, during the alkaline etching, to cause a deteriorated wafer quality so that the characteristics of semiconductor devices formed by the wafer are significantly degraded.

As measures to prevent a deteriorated wafer quality due to the alkaline etching solution as mentioned above, the use of a highly pure alkaline solution may be contemplated. However, such highly pure alkaline solutions available on the market are only extremely expensive ones of analysis grade, and the use of such an expensive alkaline solution for industrial use is not at all feasible in terms of cost. It has been found, in addition, that even these highly pure alkaline solutions are not sufficient for preventing a deteriorated wafer quality.

It is contemplated that to solve the problems of the prior art mentioned above, an alkaline solution should be more purified. Generally, it tends to think that the purification of a solution requires to remove contaminant metal impurities from the solution of interest. However, according to a recent outcome of the present inventors' devoted researches, it was revealed that the mechanism of contaminating a silicon substrate with metallic impurities contained in an alkaline solution is caused by deposition of metallic ions existing in the alkaline solution as dissolved species on the surface of the silicon substrate by adsorption or electro-chemical reaction.

It was found from this fact that an effect similar to substantial purification of an alkaline solution can be produced by transforming metallic impurities into a form which does not cause the contamination, even without removing metallic impurities from an alkaline solution. In other words, if impurity metallic ions existing in an alkaline solution are nonionized, the quality of semiconductor wafers will not be deteriorated even if the wafers are etched using an alkaline solution physically including metallic impurities (fine solid metal impurities) therein. Thus, the present invention was completed.

OBJECTS AND SUMMARY OF THE INVENTION

It is therefore an object of the present invention to provide a method of purifying an alkaline solution which is capable of extremely efficiently nonionizing metallic impurity ions in an alkaline solution at a low cost, and a method of etching semiconductor wafers which is capable of etching the semiconductor wafers using the purified alkaline solution without deteriorating the quality thereof.

To achieve the object mentioned above, the present invention is characterized by dissolving a reducing agent having an oxidation potential lower than a reversible electrode potential of metallic ions existing in the alkaline solution to nonionize the metallic ions existing in the alkaline solution.

The reducing agent, though depending on metallic ions existing in the alkaline solution, may be a strong reducing agent having an extremely low oxidation potential, for example, hypophosphites, dithionites, boron hydride compounds, aldehydes, hydrazine compounds and so on. These materials may be used individually or in mixture.

While the amount added to an alkaline solution depends on a used reducing agent and is not limited in particular as long as the effect of the present invention can be achieved, 2.5 g/liter or more is preferable when dithionites are used. If the dissolved amount of a reducing agent is too small, the effect of the present invention cannot be sufficiently achieved. Conversely, an excessively large amount of dissolved reducing agent is disadvantageous also from an economic point of view.

A method of etching semiconductor wafer according to the present invention is characterized by dissolving a reducing agent having an oxidation potential lower than a reversible electrode potential of metallic ions existing in the alkaline solution to nonionize the metallic ions existing in the alkaline solution, and etching semiconductor wafers using the alkaline solution subjected to the nonionization.

For the nonionization for the alkaline solution, the above-mentioned method of nonionizing an alkaline solution may be used.

While impurity metallic ions to be nonionized in the present invention include nickel ions, copper ions, chromium ions, iron ions, and so on, it is particularly important from the viewpoint of the quality of silicon wafers, which are representative of semiconductor wafers, to nonionize nickel ions which have a large diffusion rate within a silicon crystal.

The purification of an alkaline solution, as termed in the present invention, means that impurity metallic ions in an alkaline solution are nonionized. Even if impurity metallic elements exist in an alkaline solution in a physical or solid state, a purified state, as termed in the present invention, is present unless they exist in a metallic ion state.

The method of purifying an alkaline solution according to the present invention involves nonionizing metallic ions existing in an alkaline solution using a reducing agent, where a reaction by which the metallic ions are reduced by a reducing agent and deposited as nonions (metal) is expressed by the following chemical formula:

$$M^{n+}m + R = M + O \quad (1)$$

where $M^{n+}m$ represents metallic ions, R a reducing agent, and O an oxidant.

For the reaction expressed by Formula (1) to occur, an oxidation potential of the reducing agent must be lower than a reversible electrode potential of the metal.

For example, if nickel ions exist in an alkaline solution as metallic impurities, the reversible electrode potential of nickel ions in the alkaline solution is expressed by:

$$HNiO_2^- H_2O + 2e = Ni + 3OH^- : -0.9(E/V) \quad (2)$$

Thus, for reducing the metallic ions using a reducing agent to be deposited as nonions (metal), a reducing agent having an oxidation potential lower than −0.9 (E/V) may be dissolved in the alkaline solution. Taking sodium dithionite ($Na_2S_2O_4$) as an example of such a reducing agent, the oxidation potential of the sodium dithionite in the alkaline solution is expressed by:

$$2SO_3^{2-} + 2H_2O + 2e = S_2O_4^{2-} + 4OH^- : -1.1(E/V) \quad (3)$$

so that the nickel ions are reduced and deposited as nonions (metal).

The above and other objects, features and advantages of the present invention will become apparent from the following detailed description when read in conjunction with the accompanying drawings.

DETAILED DESCRIPTION OF THE INVENTION

The present invention will hereinafter be described in more specific manner by way of the following examples which should be construed as illustrative rather than restrictive.

EXAMPLE 1

Purification of Sodium Hydroxide Solution with Sodium Dithionite

A sodium hydroxide solution (45%, 20 liters, 80° C.) was respectively dosed with 20, 50 and 100 grams of sodium dithionite ($Na_2S_2O_4$) to prepare solutions. 10 ml of the respective solutions were sampled, and diluted to 45 times. Then, the nickel ion concentration was analyzed by an ion chromatography. The results of the analysis are shown in FIG. 1.

Comparative Example 1

An analysis was made in a manner similar to Example 1 except that sodium dithionite ($Na_2S_2O_4$) was not dosed in a sodium hydroxide solution. The results are shown together in FIG. 1.

Figure 1:
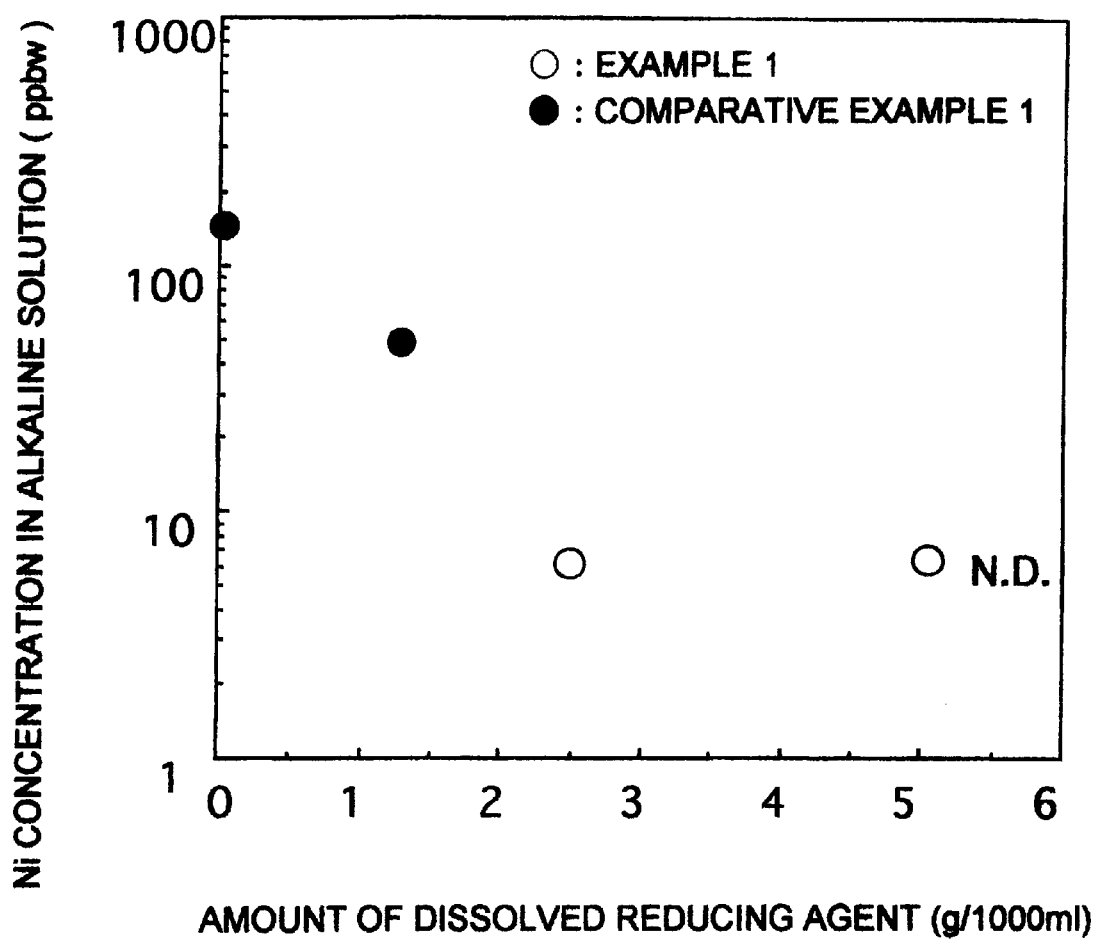
FIG. 1 is a graph representing the relationship between the amounts of dissolved reducing agents and Ni concentrations in alkaline solutions in Example 1 and Comparative Example 1.

As is apparent from FIG. 1, it is understood that nickel ions in the sodium hydroxide solution are rapidly decreased or nonionized only by dissolving a small amount of sodium dithionite. In the graph, N.D. is an abbreviation which means that the measured data have been under a detection limit.

EXAMPLE 2

Etching Using Sodium Hydroxide Solution Purified with Sodium Dithionite

A sodium hydroxide solution (45%, 20 liters, 80° C.) was dosed with 20, 50, 100 grams of sodium dithionite ($Na_2S_2O_4$), and two silicon wafers (Czochralski-grown, p-type, <100>-oriented, 0.005–0.010 Ωcm, 200 mm-diameter, lapped silicon wafers) were immersed in each of the solutions to etch the surfaces of the wafers for 10 minutes, and amounts of contaminants on the wafers were examined.

The wafers were evaluated in the following manner. One side of each etched wafer was subjected to sand blasting and then thermal oxidation at 600° C. to collect metal impurities diffused into the wafer during the etching in a thermal oxide film formed on the sand-blasted surface of the wafer. The thermal oxide film was vapor phase decomposed with hydrofluoric acid vapor. The decomposed materials were collected with droplets including hydrofluoric acid. The collected materials were analyzed by ICP-MS (Inductively Coupled Plasma Mass Spectroscopy). The results are shown in FIG. 2.

Comparative Example 2

An analysis was made in a manner similar to Example 2 except that etching solutions were prepared without sodium dithionite ($Na_2S_2O_4$). The results are shown together in FIG. 2.

Figure 2:
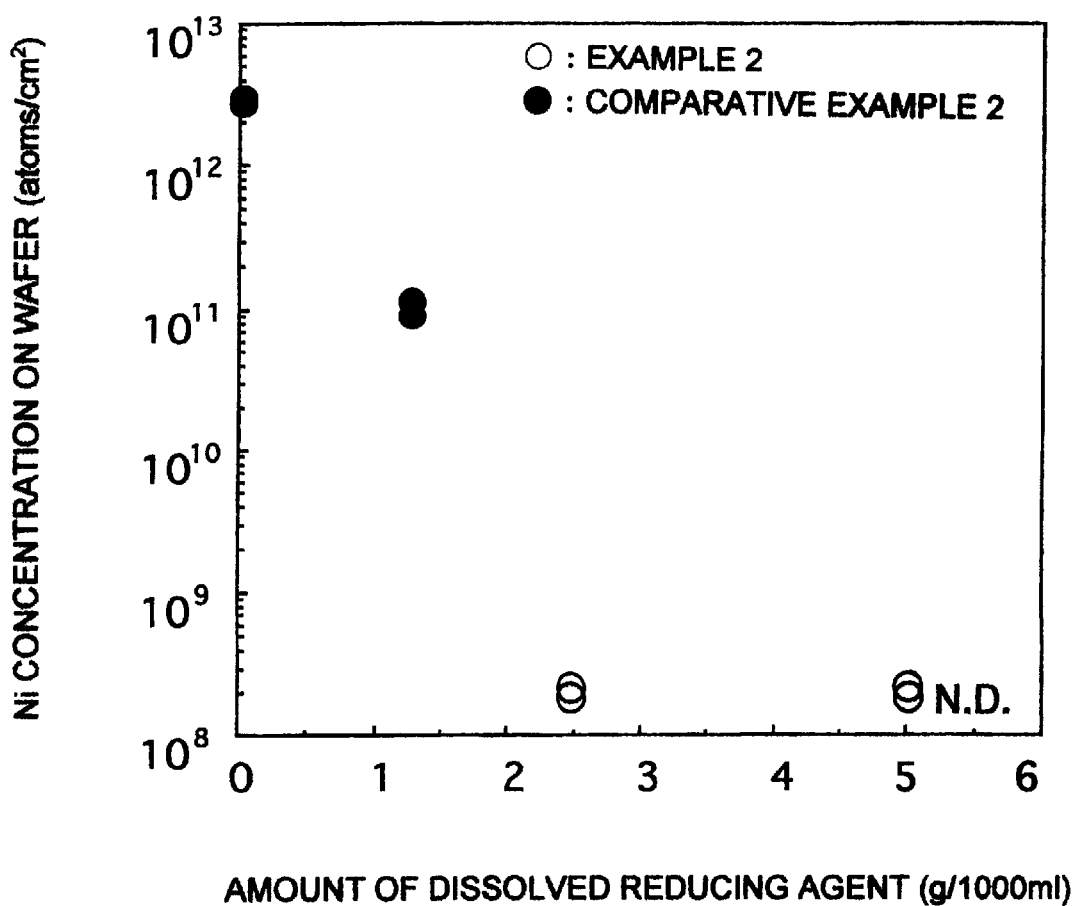
FIG. 2 is a graph representing the relationship between the amounts of dissolved reducing agents and Ni concentrations on wafers in Example 2 and Comparative Example 2.

As is apparent from FIG. 2, it can be confirmed that a nickel concentration is largely reduced on a wafer etched with the sodium hydroxide solution dosed with sodium dithionite. In the graph, N.D. is an abbreviation which means that the measured data have been under detection limit.

It is found that the present invention enables metallic ions in an alkaline solution to be extremely efficiently nonionized at a low cost, and that semiconductor wafers can be etched without deteriorating the quality thereof using the thus purified alkaline solution.

As described above, the method of purifying an alkaline solution according to the present invention is advantageous in that metallic ions (nickel, chromium, ion, copper and so on) in an alkaline solution can be significantly reduced through simple manipulations in a short time and at a low cost even if a large amount of alkaline solution should be treated. Also, according to the method of etching semiconductor wafers of the present invention, the amount of metal contaminants due to the etching of semiconductor wafers is significantly reduced by using an alkaline solution with a lower metallic ion concentration during the etching, without any deterioration in wafer quality or deterioration in characteristics of semiconductor devices.

Obviously, various minor changes and modifications of the present invention are possible in the light of the above teaching. It is therefore to be understood that within the scope of the appended claims the invention may be practiced otherwise than as specifically described.

What is claimed is:

1. A method of etching semiconductor wafers comprising the steps of:

dissolving a reducing agent in an alkaline solution, said reducing agent having an oxidation potential lower than a reversible electrode potential of metallic ions existing in said alkaline solution;

nonionizing said metallic ions existing in said alkaline solution into neutral metal atoms; and etching semiconductor wafers using said alkaline solution subjected to the nonionization.

2. A method of etching semiconductor wafers according to claim 1, wherein said metal ions are nickel ions.

3. The method of claim 1 wherein the concentration of metallic ions in said alkaline solution is decreased by said step of nonionizing prior to said step of etching.

4. The method of claim 1 wherein said wafers are etched without removing metallic impurities from the alkaline solution.

5. A method of etching semiconductor wafers according to claim 1, wherein said reducing agent is one kind or two or more kinds of reducing agents selected from the group consisting of dithionites, hypophosphites, boron hydride compounds, aldehydes and hydrazine compounds.

6. A method of etching semiconductor wafers according to claim 5, wherein said metal ions are nickel ions.

7. A method of etching semiconductor wafers according to claim 1, wherein said reducing agent is dithionites, and a dissolved amount thereof is 2.5 grams/liter or more.

8. A method of etching semiconductor wafers according to claim 7, wherein said metal ions are nickel ions.

* * * * *